US009096255B2

(12) United States Patent
MacLaughlin

(10) Patent No.: US 9,096,255 B2
(45) Date of Patent: Aug. 4, 2015

(54) FRICTION COMPENSATION LOGIC OF MOTOR DRIVEN POWER STEERING AND METHOD THEREOF

(71) Applicant: HYUNDAI MOBIS CO., LTD., Seoul (KR)

(72) Inventor: Kevin MacLaughlin, Yongin-si (KR)

(73) Assignee: Hyundai Mobis Co., Ltd. (KR)

( * ) Notice: Subject to any disclaimer, the term of this patent is extended or adjusted under 35 U.S.C. 154(b) by 107 days.

(21) Appl. No.: 14/090,528

(22) Filed: Nov. 26, 2013

(65) Prior Publication Data

US 2015/0112551 A1    Apr. 23, 2015

(30) Foreign Application Priority Data

Oct. 22, 2013  (KR) ........................ 10-2013-0126220

(51) Int. Cl.
*B62D 5/04*      (2006.01)
*B62D 6/00*      (2006.01)

(52) U.S. Cl.
CPC .................................. *B62D 5/0463* (2013.01)

(58) Field of Classification Search
USPC .......... 701/41, 42, 43; 180/446; 318/437, 432
See application file for complete search history.

(56) References Cited

U.S. PATENT DOCUMENTS

| 2002/0043423 | A1* | 4/2002 | Endo et al. ................... 180/446 |
| 2002/0060538 | A1* | 5/2002 | Hara et al. .................... 318/432 |
| 2002/0116105 | A1* | 8/2002 | Chen et al. ...................... 701/41 |
| 2004/0019417 | A1* | 1/2004 | Yasui et al. ..................... 701/36 |
| 2006/0074541 | A1* | 4/2006 | Ono et al. ....................... 701/80 |
| 2006/0076916 | A1* | 4/2006 | Heilig et al. .................. 318/437 |
| 2007/0205041 | A1* | 9/2007 | Nishizaki et al. ............. 180/446 |
| 2008/0067960 | A1* | 3/2008 | Maeda et al. ............ 318/400.02 |
| 2009/0055049 | A1* | 2/2009 | Sakaguchi et al. .............. 701/41 |
| 2012/0209475 | A1* | 8/2012 | Birsching et al. .............. 701/42 |
| 2013/0261894 | A1* | 10/2013 | Kojima .......................... 701/41 |

FOREIGN PATENT DOCUMENTS

KR   10-2012-0053300 A   5/2012

* cited by examiner

*Primary Examiner* — Ronnie Mancho
(74) *Attorney, Agent, or Firm* — Knobbe, Martens, Olson & Bear LLP

(57) ABSTRACT

Exemplary embodiments of the present invention relate to a friction compensation logic of MDPS and a friction compensation method using the same. The friction compensation logic of MDPS in accordance with an embodiment of the present invention includes: a signal processor configured to extract only a signal having a limited range from column torque signals input from a column torque; a friction compensation sign calculator configured to determine a friction compensation sign by integrating the column torque signal extracted by the signal processor and calculating the friction compensation sign by limiting the integrated value to a set value; and a friction compensation torque calculator configured to calculate a friction compensation torque by reflecting a friction compensation amount to a value calculated by the friction compensation sign calculator.

12 Claims, 6 Drawing Sheets

FRICTION COMPENSATION LOGIC OF MOTOR DRIVEN POWER STEERING AND METHOD THEREOF

CROSS-REFERENCES TO RELATED APPLICATIONS

The present application claims priority under 35 U.S.C 119(a) to Korean Application No. 10-2013-0126220, filed on Oct. 22, 2013, in the Korean Intellectual Property Office, which is incorporated herein by reference in its entirety set forth in full.

BACKGROUND

Exemplary embodiments of the present invention relate to a friction compensation logic of motor driven power steering (MDPS) and a friction compensation method using the same, and more particularly, to a friction compensation logic of MDPS and a friction compensation method using the same capable of calculating a friction compensation torque by separating sections set by friction at the time of driving the MDPS and reflecting the calculated friction compensation torque at the time of controlling an MDPS motor.

Generally, a motor driven power steering (hereinafter, referred to as 'MDPS') system is a system which does not generally use a principle of operating a power handle by circulating oil by driving a power pump, but operates the power handle by operating a steering motor at the time of starting a vehicle by driving the steering motor for generating a steering force which is separately mounted at a lower end of a steering wheel shaft.

In order to smoothly operate the MDPS system, the MDPS system calculates a motor torque command by adding/subtracting a torque control loop, a damping torque active restoration torque, and a friction compensation torque at the time of calculating the motor torque command, in which the reason of adding friction compensation torque is as follows.

Generally, in the MDPS system, when the steering motor does not generate a required assist steering force by friction generated when each steering component is driven, the driving of the power handle by the steering motor is not easy, such that a sense of steering or a sense of initial build-up may deteriorate, thereby making a driver feel a sense of difference in steering.

Further, as an on-center column torque is excessive due to the friction, torque variation is excessive, such that an artificial sense of build-up may occur.

Therefore, a development of a friction compensation logic of MDPS to reduce the friction of the MDPS system is urgently required.

Background Art of the present invention is disclosed in Korean Patent Laid-Open Publication No. 10-2012-0053300 (Published on May 25, 2012, Title of The Invention: System For Control Motor Driven Power Steering Of Vehicle And Method Thereof).

SUMMARY

An embodiment of the present invention relates to a a friction compensation logic of MDPS and a friction compensation method using the same capable of calculating a friction compensation torque by separating sections set by friction at the time of driving the MDPS and reflecting the calculated friction compensation torque at the time of controlling an MDPS motor.

Another embodiment of the present invention relates to a friction compensation logic of MDPS and a friction compensation method using the same capable of improving a friction reduction effect by generating and reflecting a white noise signal without a low frequency component at the time of calculating a friction compensation torque.

In one embodiment, a friction compensation logic of MDPS includes: a signal processor configured to extract only a signal having a limited range from column torque signals input from a column torque; a friction compensation sign calculator configured to determine a friction compensation sign by integrating the column torque signal extracted by the signal processor and calculating the friction compensation sign by limiting the integrated value to a set value; and a friction compensation torque calculator configured to calculate a friction compensation torque by reflecting a friction compensation amount to a value calculated by the friction compensation sign calculator.

The signal processor may extract only the signal in a section set by friction at the time of driving of the MDPS in the limited range.

The signal processor may extract only the signal in the limited range through a band pass filter (BPF).

The friction compensation torque calculator may calculate the friction compensation torque by reflecting a predetermined friction compensation gain by the friction compensation sign determined by the friction compensation sign calculator when a motor rate is equal to or larger than a set rate, and calculate the friction compensation torque by multiplying the friction compensation gain depending on the integrated value by the value calculated by the friction compensation sign calculator when the motor rate is less than the set rate.

The friction compensation logic of MDPS may further include: a noise signal processor configured to generate a random noise signal and pass the generated random noise signal through a high pass filter through which a low frequency component noise is removed; a noise signal sign determiner configured to make a size by adding a set value to a high frequency noise signal passing through the high pass filter and determine a sign of the noise signal; and a noise signal reflector configured to reflect a value calculated by multiplying a dithering gain by the noise signal having a sign determined by the noise signal sign determiner when the friction compensation torque calculator calculates the friction compensation torque.

The noise signal sign determiner may determine the sign of the noise signal by multiplying the friction compensation sign determined by the friction compensation sign calculator by the noise signal.

In another embodiment, a friction compensation method using a friction compensation logic of MDPS includes: extracting only a signal having a limited range from column torque signals input from a column torque; determining a friction compensation sign by integrating the extracted column torque signal and calculating the friction compensation sign by limiting the integrated value to a set value; and calculating a friction compensation torque by reflecting a friction compensation amount to the calculated value.

In the extracting of only the signal having a limited range for the column torque signal, only the signal in a section set by friction at the time of driving of the MDPS in the limited range may be extracted.

In the extracting of only the signal having a limited range for the column torque signal, only the signal in the limited range may be extracted by a band pass filter (BPF).

In the calculating of the friction compensation torque, the friction compensation torque may be calculated by reflecting a predetermined friction compensation gain to the determined friction compensation sign when a motor rate is equal to or more than a set rate, and the friction compensation torque is calculated by multiplying the value calculated in the calculating of the friction compensation sign by limiting the integrated value to the set value by the friction compensation gain when the motor rate is less than the set rate.

The friction compensation logic of MDPS using a friction compensation logic of MDPS may further include: generating a random noise signal and passing the generated random noise signal through a high pass filter through which a low frequency component noise is removed; making a size by adding a set value to a high frequency noise signal passing through the high pass filter and determining a sign of the noise signal; and reflecting a value obtained by multiplying a dithering gain by the noise signal having the determined sign at the time of calculating the friction compensation torque in the calculating of the friction compensation torque.

In the determining of the sign of the noise signal, the sign of the noise signal may be determined by multiplying the friction compensation sign determined in the calculating of the friction compensation sign by limiting the integrated value to the set value by the noise signal.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Figure 1:
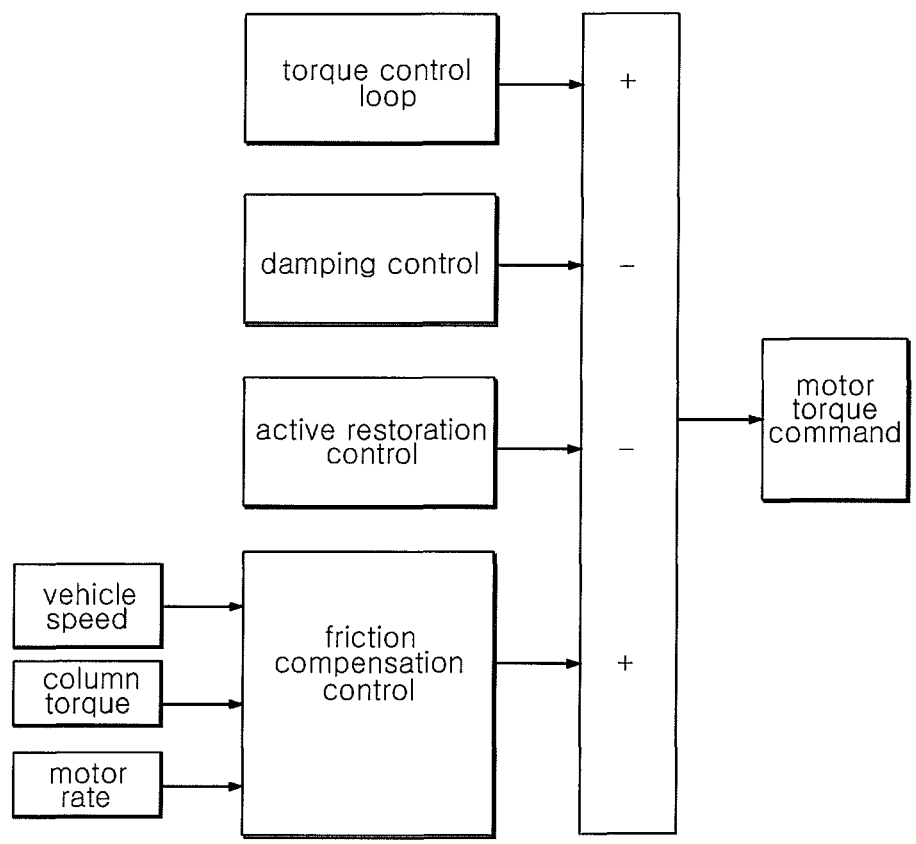
FIG. 1 is a reference diagram illustrating values reflected at the time of calculating an MDPS motor torque command value.

Hereinafter, embodiments of the present invention will be described with reference to accompanying drawings. However, the embodiments are for illustrative purposes only and are not intended to limit the scope of the invention.

A friction compensation logic and a friction compensation method using the same in accordance with an embodiment of the present invention will be described with reference to the accompanying drawings. During the process, a thickness of lines, a size of components, or the like, illustrated in the drawings may be exaggeratedly illustrated for clearness and convenience of explanation.

Further, the following terminologies are defined in consideration of the functions in the present invention and may be construed in different ways by intention or practice of users and operators. Therefore, the definitions of terms used in the present description should be construed based on the contents throughout the specification.

Figure 2:
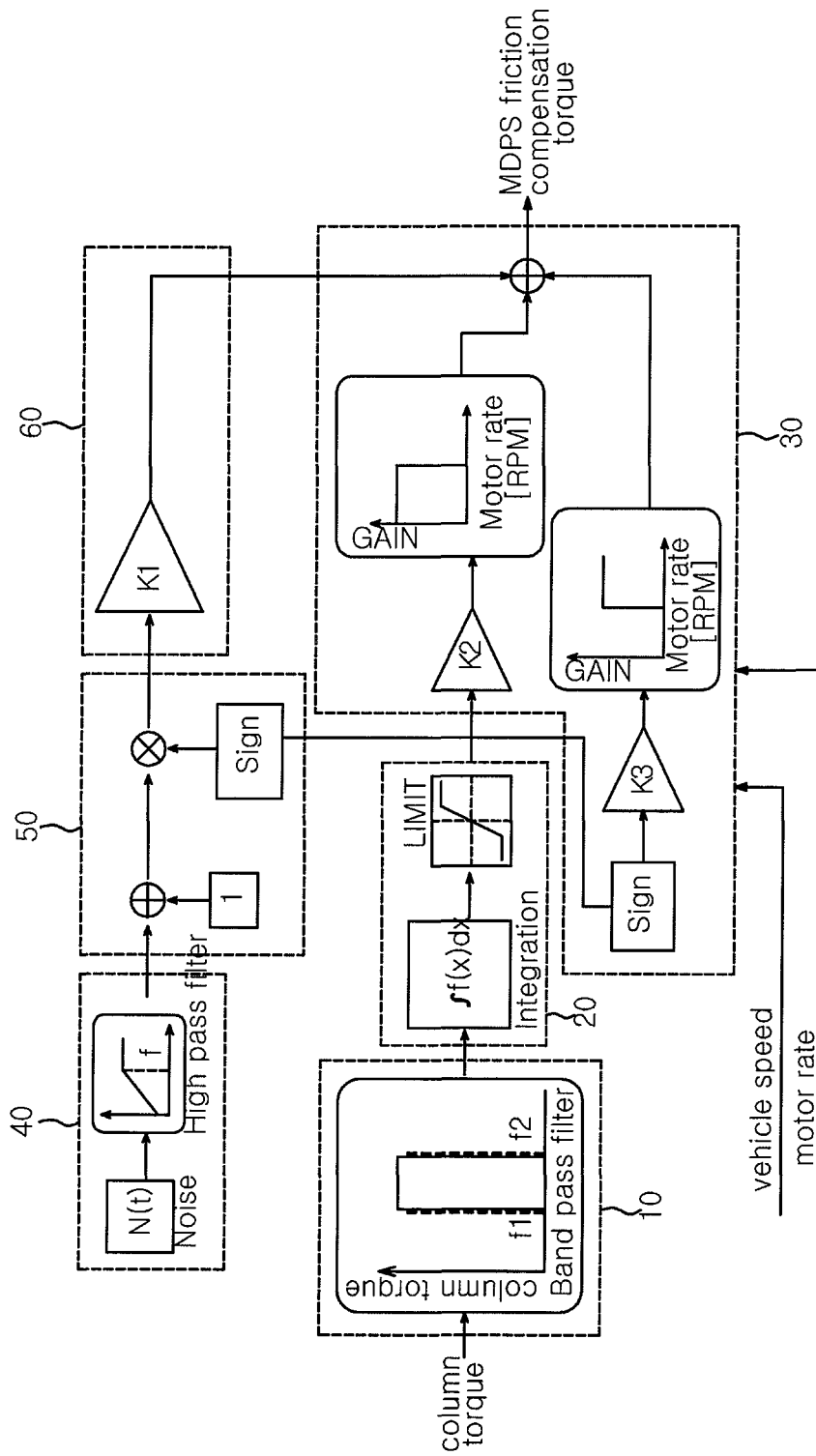
FIG. 2 is a diagram for explaining a friction compensation logic of MDPS in accordance with an embodiment of the present invention.
Figure 3:
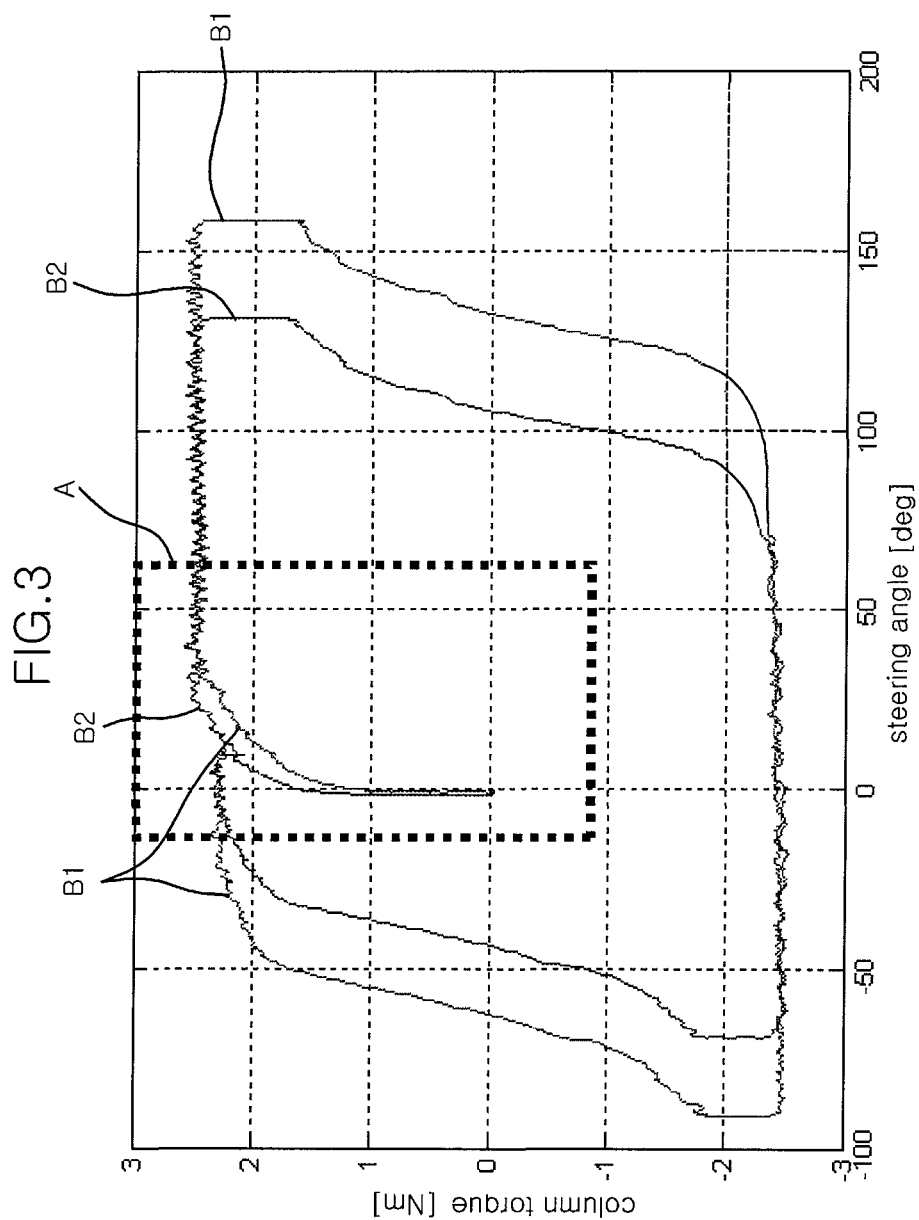
FIG. 3 is a diagram illustrating performance evaluation results for verifying an effect depending on whether the friction compensation logic of MDPS in accordance with the embodiment of the present invention is applied or not.
Figure 4:
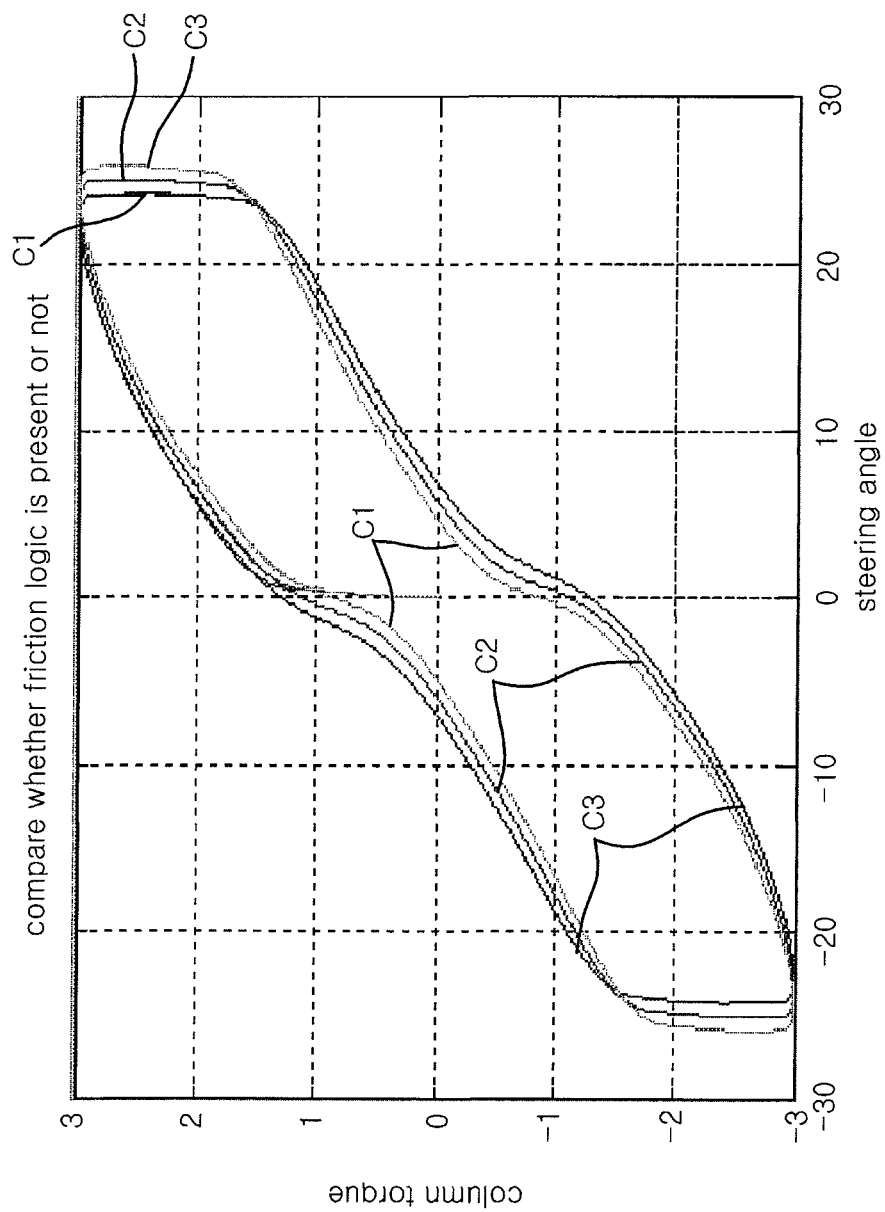
FIG. 4 is a diagram illustrating simulation results for comparing whether the friction compensation logic of MDPS in accordance with the embodiment of the present invention is applied or not.

FIG. 2 is a diagram for explaining a friction compensation logic of MDPS in accordance with an embodiment of the present invention, FIG. 3 is a diagram illustrating performance evaluation results for verifying an effect depending on whether the friction compensation logic of MDPS in accordance with the embodiment of the present invention is applied or not, and FIG. 4 is a diagram illustrating simulation results for comparing whether the friction compensation logic of MDPS in accordance with the embodiment of the present invention is applied or not.

A logic calculating a friction compensation torque for compensating for friction generated in a motor driven power steering (MDPS) system is as follows.

As illustrated in FIG. 2, the friction compensation logic of MDPS in accordance with an embodiment of the present invention includes a signal processor 10, a friction compensation sign calculator 20, a friction compensation torque calculator 30, a noise signal processor 40, a noise signal sign determiner 50, and a noise signal reflector 60.

The signal processor 10 passes column torque signals input from a column torque through a band pass filter (BDF) through which only a frequency band having a limited range passes.

That is, as illustrated in FIG. 2, the MDPS system separates sections f1 and f2 set by friction to extract a column torque signal passing through the band pass filter (BPF) from the column torque signals input from the column torque.

The friction compensation sign calculator 20 determines a friction compensation sign by integrating the column torque signal passing through the band pass filter in the signal processor 10 and limits the integrated value to a set value (for example, 1).

That is, a friction compensation direction is determined by integrating the column torque signal passing through the band pass filter.

The friction compensation torque calculator 30 reflects a friction compensation amount to a value calculated by the friction compensation sign calculator 20 to calculate the friction compensation torque.

In this case, when an input motor rate is equal to or larger than a set rate (for example, 1,000 RPM or more), the friction compensation torque calculator 30 reflects a predetermined friction compensation gain K3 (for example, 1) to the friction compensation sign determined by the friction compensation sign calculator 20 to calculate the friction compensation torque.

In this case, when the motor rate is equal to or larger than the set rate, the reason of reflecting the predetermined friction compensation gain K3 is to make the friction compensation fast by removing time to calculate the friction compensation gain when a vehicle speed is a high speed.

Further, when the motor rate is less than the set rate (for example, less than 1,000 RPM), the friction compensation torque is calculated by multiplying the value calculated by the friction compensation sign calculator 20 by a friction compensation gain K2.

The noise signal processor 40 generates a noise signal based on a random function and passes the generated noise signal through a high pass filter (HPF) from which a low frequency component noise is removed.

In this case, the noise signal processor 40 randomly generates a white noise signal and passes the generated white noise signal through the high pass filter to remove the low frequency component noise, such that a driver does not recognize the noise.

The noise signal sign determiner 50 makes a size by adding the set value (for example, 1) to a high frequency noise signal passing through the high pass filter and multiplies the size by the friction compensation sign determined by the friction compensation sign calculator 20 to determine a sign of the noise signal.

That is, an application direction of the friction compensation torque is detected by adding 1 to the high frequency noise signal and reflecting a friction compensation direction determined by integrating the column torque signal passing through the band pass filter.

The noise signal reflector 60 reflects a value calculated by multiplying a dithering gain K1 by the noise signal having a sign determined by the noise signal sign determiner 50, when the friction compensation torque calculator 30 calculates the friction compensation torque.

That is, when the friction compensation torque is calculated, the noise signal without the low frequency compensation is generated and reflected to be able to more increase the friction reduction effect.

As can be appreciated from the portion A of FIG. 3, this may be confirmed that in the case in which a steering angle is 0°, an initial column torque B1 when the friction compensation torque is applied is more reduced than an initial column torque B2 when the friction compensation torque is not applied.

Further, it may be confirmed from simulation results of FIG. 4 that as the friction compensation torque is applied in an order of an initial column torque C3 when the friction compensation torque is not applied, an initial column torque C2 when the friction compensation torque is applied at 0.5 Nm, and an initial column torque C1 when the friction compensation torque is applied at 1 Nm, the initial column torque is reduced and thus the column torque variation is reduced.

As described above, the friction compensation logic of MDPS in accordance with the embodiments of the present invention separates the sections set by the friction at the time of driving the MDPS, calculates the friction compensation torque for the sections, and reflects the calculated friction compensation torque at the time of controlling the MDPS motor so as to reduce an on-center column torque and the column torque variation, thereby improving a sense of steering, reducing a sense of difference in the build-up section in which a considerable torque is applied, and improving the restoration of a vehicle so as to improve the sense of steering overall.

Figure 5:
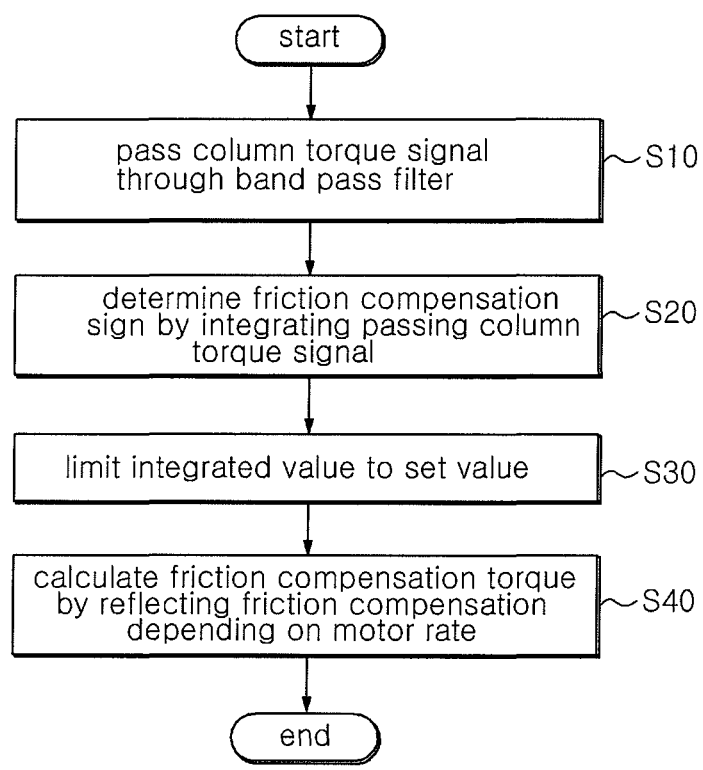
FIG. 5 is a flow chart illustrating an operation flow of a friction compensation method using the friction compensation logic of MDPS in accordance with the embodiment of the present invention.

FIG. 5 is a flow chart illustrating an operation flow of a friction compensation method using the friction compensation logic of MDPS in accordance with the embodiment of the present invention, and the detailed operation of the embodiment of the present invention will be described with reference to FIG. 5.

A method of calculating the friction compensation torque for compensating for friction generated from the motor driven power steering (MDPS) system first passes the column torque signals input from the column torque through the band pass filter (BPF) through which only the frequency band having a limited range passes (S10).

Next, the friction compensation sign is determined by integrating the column torque signal passing through the band pass filter (S20).

That is, the friction compensation direction is determined by integrating the column torque signal passing through the band pass filter.

Next, in step S20, the integrated value is limited to the set value (for example, 1) (S30).

Next, the friction compensation torque is calculated by reflecting the friction compensation amount depending on the motor rate to the value calculated in step S30 (S40).

In this case, when the input motor rate is equal to or larger than the set rate (for example, 1,000 RPM or more), the friction compensation torque is calculated by reflecting the predetermined friction compensation gain K3 (for example, 1) to the friction compensation sign determined in step S20 so as to make the friction compensation fast.

In this case, when the motor rate is equal to or larger than the set rate, the reason of reflecting the predetermined friction compensation gain K3 is to make the friction compensation fast by removing time to calculate the friction compensation gain when a vehicle speed is a high speed.

Further, when the motor rate is less than the set rate (for example, less than 1,000 RPM), the friction compensation torque is calculated by multiplying the friction compensation gain K2 depending on the integrated value by the value calculated in step S30.

The friction reduction effect is obtained even by the friction compensation torque which is calculated by the above-mentioned operation order, but the friction reduction effect may be increased by adding the noise signal to the friction compensation torque as described below.

Figure 6:
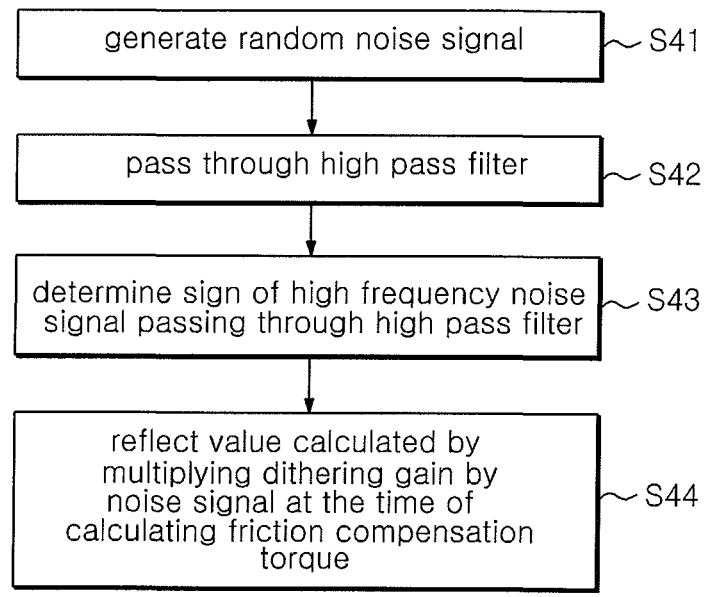
FIG. 6 is a flow chart illustrating a process of reflecting a noise signal in the friction compensation method using the friction compensation logic of MDPS in accordance with an embodiment of the present invention.

FIG. 6 is a flow chart illustrating a process of reflecting the noise signal in the friction compensation method using the friction compensation logic of MDPS in accordance with an embodiment of the present invention.

First, a random noise signal is generated (S41) and then passes through the high pass filter (HPF) through which the low frequency component noise is removed (S42).

In this case, the noise signal processor 40 randomly generates a white noise signal and passes the generated white noise signal through the high pass filter to remove the low frequency component noise, such that a driver does not recognize the noise.

Next, the sign of the noise signal is determined by adding the set value (for example, 1) to the high frequency noise signal passing through the high pass filter and reflecting the friction compensation sign determined in step S20 (S43).

Next, the value obtained by multiplying the dithering gain K1 by the noise signal having a sign determined in step S43 is reflected to the friction compensation torque calculated in step S40.

That is, when the friction compensation torque is calculated, the noise signal without the low frequency compensation is generated and reflected to be able to more increase the friction reduction effect.

As described above, the friction compensation method using the friction compensation logic of MDPS in accordance with the embodiments of the present invention separates the sections set by the friction at the time of driving the MDPS, calculates the friction compensation torque for the sections, and reflects the calculated friction compensation torque at the time of controlling the MDPS motor so as to reduce an on-center column torque and the column torque variation, thereby improving a sense of steering, reducing a sense of difference in the build-up section in which a considerable torque is applied, and improving the restoration of a vehicle so as to improve the sense of steering overall.

According to the friction compensation logic of MDPS and the friction compensation method using the same in accordance with the embodiments of the present invention, the sections set by the friction may be separated at the time of driving the MDPS, the friction compensation torque for the sections may be calculated, and the calculated friction compensation torque may be reflected at the time of controlling the MDPS motor so as to reduce the on-center column torque and the column torque variation, thereby improving the sense of steering, reducing the sense of difference in the build-up section in which the considerable torque is applied, and improving the restoration of a vehicle so as to improve the sense of steering overall.

Further, in accordance with the embodiments of the present invention, the white noise signal without the low frequency component may be generated and reflected at the time of calculating the friction compensation torque to be able to more increase the friction reduction effect.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A friction compensation logic of MDPS, comprising:
   a signal processor configured to extract only a signal having a limited range from column torque signals input from a column torque;
   a friction compensation sign calculator configured to determine a friction compensation sign by integrating the column torque signal extracted by the signal processor and calculating the friction compensation sign by limiting the integrated value to a set value; and
   a friction compensation torque calculator configured to calculate a friction compensation torque by reflecting a friction compensation amount to a value calculated by the friction compensation sign calculator.

2. The friction compensation logic of MDPS of claim 1, wherein the signal processor extracts only the signal in a section set by friction at the time of driving of the MDPS in the limited range.

3. The friction compensation logic of MDPS of claim 1, wherein the signal processor extracts only the signal in the limited range through a band pass filter (BPF).

4. The friction compensation logic of MDPS of claim 1, wherein the friction compensation torque calculator calculates the friction compensation torque by reflecting a predetermined friction compensation gain by the friction compensation sign determined by the friction compensation sign calculator when a motor rate is equal to or larger than a set rate, and
   calculates the friction compensation torque by multiplying the friction compensation gain depending on the integrated value by the value calculated by the friction compensation sign calculator when the motor rate is less than the set rate.

5. The friction compensation logic of MDPS of claim 1, further comprising:
   a noise signal processor configured to generate a random noise signal and pass the generated random noise signal through a high pass filter through which a low frequency component noise is removed;
   a noise signal sign determiner configured to make a size by adding a set value to a high frequency noise signal passing through the high pass filter and determine a sign of the noise signal; and
   a noise signal reflector configured to reflect a value calculated by multiplying a dithering gain by the noise signal having a sign determined by the noise signal sign determiner when the friction compensation torque calculator calculates the friction compensation torque.

6. The friction compensation logic of MDPS of claim 5, wherein the noise signal sign determiner determines the sign of the noise signal by multiplying the friction compensation sign determined by the friction compensation sign calculator by the noise signal.

7. A friction compensation method using a friction compensation logic of MDPS, comprising:
   extracting only a signal having a limited range from column torque signals input from a column torque;
   determining a friction compensation sign by integrating the extracted column torque signal and calculating the friction compensation sign by limiting the integrated value to a set value; and
   calculating a friction compensation torque by reflecting a friction compensation amount to the calculated value.

8. The friction compensation method of claim 7, wherein in the extracting of only the signal having a limited range for the column torque signal, only the signal in a section set by friction at the time of driving of the MDPS in the limited range is extracted.

9. The friction compensation method of claim 7, wherein in the extracting of only the signal having a limited range for the column torque signal, only the signal in the limited range is extracted by a band pass filter (BPF).

10. The friction compensation method of claim 7, wherein in the calculating of the friction compensation torque, the friction compensation torque is calculated by reflecting a predetermined friction compensation gain to the determined friction compensation sign when a motor rate is equal to or more than a set rate, and
    the friction compensation torque is calculated by multiplying the value calculated in the calculating of the friction compensation sign by limiting the integrated value to the set value by the friction compensation gain when the motor rate is less than the set rate.

11. The friction compensation logic of MDPS of claim 7, further comprising:
    generating a random noise signal and passing the generated random noise signal through a high pass filter through which a low frequency component noise is removed;
    making a size by adding a set value to a high frequency noise signal passing through the high pass filter and determining a sign of the noise signal; and
    reflecting a value obtained by multiplying a dithering gain by the noise signal having the determined sign at the time of calculating the friction compensation torque in the calculating of the friction compensation torque.

12. The friction compensation method of claim 11, wherein in the determining of the sign of the noise signal, the sign of the noise signal is determined by multiplying the friction compensation sign determined in the calculating of the friction compensation sign by limiting the integrated value to the set value by the noise signal.

* * * * *